US012793962B2

(12) United States Patent
Higashio

(10) Patent No.: US 12,793,962 B2
(45) Date of Patent: Nov. 10, 2026

(54) ELECTRODE MANUFACTURING FACILITY AND ELECTRODE MANUFACTURING METHOD

(71) Applicant: Prime Planet Energy & Solutions, Inc., Tokyo (JP)

(72) Inventor: Naoto Higashio, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 440 days.

(21) Appl. No.: 18/444,247

(22) Filed: Feb. 16, 2024

(65) Prior Publication Data

US 2024/0282909 A1 Aug. 22, 2024

(30) Foreign Application Priority Data

Feb. 20, 2023 (JP) ................................ 2023-024234

(51) Int. Cl.
*H01M 4/04* (2006.01)
*F26B 21/37* (2026.01)
*F26B 25/00* (2006.01)

(52) U.S. Cl.
CPC ........... *H01M 4/0471* (2013.01); *F26B 21/37* (2026.01); *F26B 25/006* (2013.01)

(58) Field of Classification Search
CPC .. H01M 4/0471; H01M 4/0404; H01M 4/139; H01M 10/052; H01M 10/0525; F26B 21/37; F26B 25/006; F26B 21/208; F26B 3/04; F26B 13/10; F26B 21/25; F26B 21/33; F26B 21/35; F26B 23/02; F26B 13/002; F26B 23/002; F26B 23/04; F26B 21/30; F26B 21/452; F26B 25/02;
(Continued)

(56) References Cited

U.S. PATENT DOCUMENTS

2015/0255780 A1* 9/2015 Tsuchiya ................. F26B 13/10
34/236
2022/0250113 A1* 8/2022 Bär ......................... H05K 3/227
(Continued)

FOREIGN PATENT DOCUMENTS

JP 2008-114203 A 5/2008
JP 2010-069435 A 4/2010
(Continued)

*Primary Examiner* — David J Laux
(74) *Attorney, Agent, or Firm* — Finnegan, Henderson, Farabow, Garrett and Dunner, LLP

(57) ABSTRACT

An electrode manufacturing facility includes a dryer, a first pipe, a solvent collection device, an outside air inlet pipe, a heat exchanger, and a second pipe. The first pipe sends an exhaust gas expelled from the dryer to the solvent collection device. The solvent collection device causes an organic solvent contained in the exhaust gas expelled from the dryer to dissolve into water to collect the organic solvent. The heat exchanger exchanges heat between the exhaust gas expelled from the dryer and the outside air inlet pipe. The second pipe is connected to a pipe to which the exhaust gas after having passed through the solvent collection device is expelled and to a portion of the outside air inlet pipe located upstream of the heat exchanger, and sends at least a portion of the exhaust gas after having passed through the solvent collection device to the outside air inlet pipe.

16 Claims, 2 Drawing Sheets

(58) Field of Classification Search
CPC .. Y02E 60/10; B05D 3/0272; B01D 53/1487; B01D 53/18; B01D 53/26
See application file for complete search history.

(56) References Cited

U.S. PATENT DOCUMENTS

| | | | | |
|---|---|---|---|---|
| 2024/0077253 | A1* | 3/2024 | Wang | F26B 3/04 |
| 2024/0145666 | A1* | 5/2024 | Bär | H01M 4/0404 |
| 2024/0280320 | A1* | 8/2024 | Moon | F26B 21/001 |
| 2024/0282909 | A1* | 8/2024 | Higashio | F26B 13/002 |

FOREIGN PATENT DOCUMENTS

| | | | |
|---|---|---|---|
| JP | 2012-097917 | A | 5/2012 |
| JP | 2013-088048 | A | 5/2013 |
| JP | 2013-137139 | A | 7/2013 |
| JP | 2013-185763 | A | 9/2013 |
| JP | 2015-206529 | A | 11/2015 |
| KR | 10-2010-0113438 | A | 10/2010 |
| KR | 10-2012-0095590 | A | 8/2012 |
| KR | 10-2013-0043073 | A | 4/2013 |
| WO | WO 2014/049692 | A1 | 4/2014 |

* cited by examiner

ELECTRODE MANUFACTURING FACILITY AND ELECTRODE MANUFACTURING METHOD

CROSS REFERENCE TO RELATED APPLICATION

The present application claims priority from Japanese Patent Application No. 2023-024234 filed on Feb. 20, 2023, which is incorporated by reference herein in its entirety.

BACKGROUND

The present invention relates to an electrode manufacturing facility and a method of manufacturing electrodes.

JP 2012-097917 A discloses a dryer apparatus that dries a substrate material having a slurry coating film while conveying the substrate material. The dryer apparatus disclosed in JP 2012-097917 A is equipped with a drying furnace for drying the coating film on the substrate material and an exhaust port for expelling the gas inside the drying furnace out of the drying furnace. The drying furnace includes a plurality of dry zones having different dry atmospheres from each other along a conveying direction of the substrate material. The exhaust port of the drying furnace is disposed downstream of the most upstream one of the plurality of dry zones. With such a dryer apparatus, the solvent evaporated from the slurry coating film is not exhausted in the most upstream dry zone (that is, the initial stage of drying), so the concentration of the solvent gas inside the drying furnace increases. When the concentration of the solvent gas inside the drying furnace increases, it approaches the saturation vapor pressure, so the evaporation of the solvent is inhibited. It is stated that this inhibits rapid drying of the slurry coating film at the initial stage of drying, so it is possible to prevent the migration that occurs due to rapid drying of the slurry coating film at the initial stage of drying.

JP 2008-114203 A discloses a method of collecting an inorganic solvent. In cases where an organic solvent is used, the organic solvent is contained in an exhaust gas in the drying step, so it is necessary to collect the organic solvent. Methods of collecting an organic solvent include a dry type method and a wet type method. In a dry type process, for example, the exhaust gas in the drying step is cooled with a cooling water or the like by an indirect heat exchanger to condense and collect a solvent component within the exhaust gas. A wet type process involves a gas absorption method using water as an absorbent. In a wet type process, the exhaust gas is introduced into an absorption tower in which water is sprayed, to thereby cause a solvent component in the exhaust gas to be absorbed into water. The publication states that in the wet type process, the lower the temperature, the higher the efficiency in absorbing the solvent component. It is stated that, for that reason, the exhaust gas to be introduced into the absorption tower should preferably be cooled in advance and brought into gas-liquid contact with a large amount of water.

SUMMARY

As demands for lithium-ion secondary batteries are expected to increase with the shift to EVs in vehicle industries, massive cost increases are expected in mass production of lithium-ion secondary batteries. In particular, it is considered desirable to lower the energy required in the drying step in manufacturing electrodes to reduce manufacturing costs. The present inventors believe that, for a method of collecting an organic solvent from the exhaust gas after the drying, a wet type process, which causes water to absorb the organic solvent, is advantageous over a dry type process, in which the exhaust gas needs to be cooled to a level at which the organic solvent condenses. Accordingly, the present inventors intend to reduce the manufacturing costs including the collecting of an organic solvent with a wet type process.

According to the present disclosure, an electrode manufacturing facility includes a dryer, a solvent collection device, a first pipe, an outside air inlet pipe, a heat exchanger, and a second pipe.

The dryer includes a drying furnace, a heater, and a conveyor device. Here, the heater is a device that heats the air supplied through the outside air inlet pipe and supplies the air to the drying furnace. The conveyor device is a device that conveys a sheet-shaped current collector coated with a mixture slurry in which electrode active material particles are dispersed in an organic solvent, along a predetermined conveyance passage in the drying furnace.

The solvent collection device is a device that causes the organic solvent contained in an exhaust gas expelled from the dryer to dissolve into water to collect the organic solvent. The first pipe is a pipe that sends the exhaust gas expelled from the dryer to the solvent collection device. The outside air inlet pipe is a pipe that introduces outside air and sends the outside air to the dryer. The heat exchanger is a device configured to exchange heat between the first pipe and the outside air inlet pipe. The second pipe is a pipe that is connected to a pipe to which the exhaust gas after having passed through the solvent collection device is expelled and to a portion of the outside air inlet pipe that is upstream of the heat exchanger, and sends at least a portion of the exhaust gas after having passed through the solvent collection device to the outside air inlet pipe.

In the above-described electrode manufacturing facility, the exhaust gas after having passed through the solvent collection device is mixed with the outside air in the outside air inlet pipe and further heat exchanged with the exhaust gas from the dryer by the heat exchanger. This allows the temperature of the outside air introduced to the dryer to be raised in advance, and lowers the energy required by the heater of the dryer.

In this case, the outside air inlet pipe, which sends the outside air to the dryer, may further include a heating device disposed downstream of the heat exchanger. In another embodiment of the electrode manufacturing facility, the outside air inlet pipe, which sends the outside air to the dryer, may be provided with a heating device disposed downstream of the heat exchanger without providing the second pipe.

According to the present disclosure, a method of manufacturing electrodes includes: a drying step of drying a sheet-shaped current collector coated with a mixture slurry in which electrode active material particles are dispersed in an organic solvent; and a solvent collecting step of collecting the organic solvent by spraying water to an exhaust gas produced in the drying step and causing the organic solvent contained in the exhaust gas to dissolve into the water. In the drying step, a portion of the exhaust gas after having been sprayed water in the solvent collecting step is mixed with outside air, heat-exchanged with the exhaust gas produced in the drying step, and introduced into the dryer. In this case, in the drying step, it is also possible that a gas in which outside air is mixed with a portion of the exhaust gas after having been sprayed with water in the solvent collecting step may be heat-exchanged with the exhaust gas produced in the drying step, thereafter further heated, and then introduced into the dryer.

In another embodiment, the method of manufacturing electrodes includes: a drying step of drying a sheet-shaped current collector coated with a mixture slurry in which electrode active material particles are dispersed in an organic solvent; and a solvent collecting step of collecting the organic solvent by spraying water to an exhaust gas produced in the drying step and causing the organic solvent contained in the exhaust gas to dissolve into the water. in the drying step, outside air is heat-exchanged with the exhaust gas produced in the drying step, further heated, and thereafter introduced into a dryer.

The electrode manufacturing methods as described above are able to raise the temperature of the outside air introduced to the dryer in advance and lower the energy required by the heater of the dryer.

DETAILED DESCRIPTION

Hereinbelow, the present disclosure will be described in detail. Unless otherwise stated, the present disclosure is not intended to limit the invention as set forth in the appended claims. The drawings are depicted schematically and do not necessarily accurately depict actual objects. The features and components that exhibit the same effects are designated by the same reference symbols as appropriate, and the description thereof will not be repeated.

Figure 1:
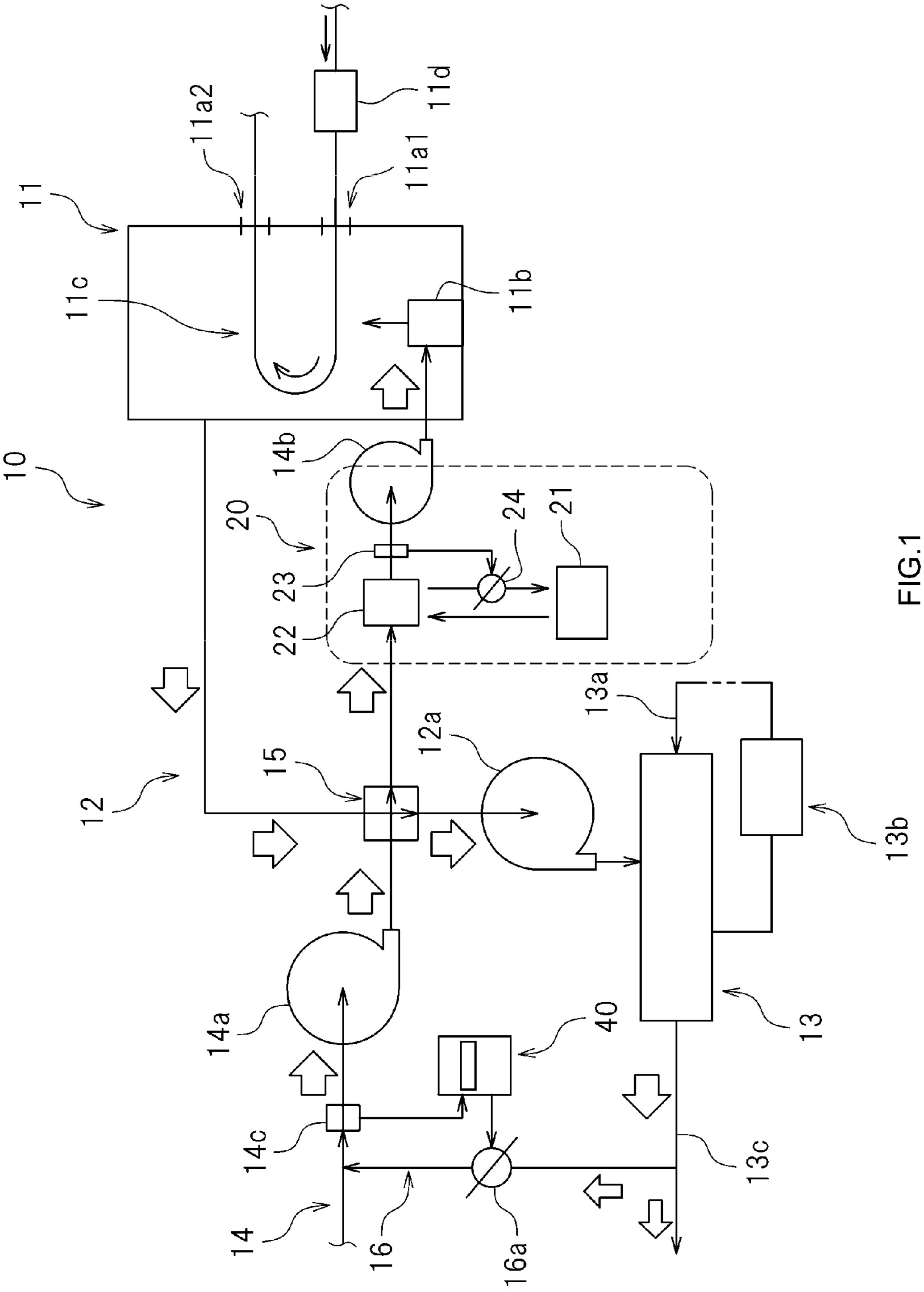
FIG. 1 is a configuration diagram illustrating the configuration of an electrode manufacturing facility 10.

FIG. 1 is a configuration diagram illustrating the configuration of an electrode manufacturing facility 10. The electrode manufacturing facility 10 is used as, for example, manufacturing equipment for manufacturing electrode sheets for use in electricity storage devices, such as lithium-ion secondary batteries and electric double layer capacitors. The electrodes manufactured by the electrode manufacturing facility 10 are such that an active material layer containing electrode active material particles is formed on a sheet-shaped substrate material serving as a current collector. A method of manufacturing an electrode sheet includes the step of preparing a mixture slurry containing electrode active material particles for a battery electrode, the step of coating a substrate material with the mixture slurry (coating step), and the step of drying the coated mixture slurry (drying step).

The mixture slurry containing a battery electrode active material includes, for example, electrode active material particles, a binder, and the like that are contained in a solvent. The mixture slurry is also referred to as a mixture paste. The step of coating a substrate material with a mixture slurry involves coating the prepared mixture slurry onto a sheet-shaped substrate material. The electrode sheet substrate material may use a metal foil, such as aluminum foil or copper foil. Herein, the electrode sheet substrate material is prepared in the form of, for example, a strip-shaped sheet. In the step of applying a mixture slurry onto a substrate material, the mixture slurry is supplied through a die or the like onto an electrode sheet conveyed in a roll-to-roll process. In the step of drying the applied mixture slurry, an active material layer containing electrode active material particles is formed on the electrode sheet by drying the applied mixture slurry. In the drying step, the electrode sheet is passed through a drying furnace to dry the mixture slurry applied on the electrode sheet. The active material layer that has undergone the drying step is adjusted to have predetermined thickness and density through a pressing step and the like.

The mainstream of the positive electrode slurry for lithium-ion secondary batteries is one that uses an organic solvent. For the positive electrode slurry, for example, polyvinylidene difluoride (hereinafter referred to as PVdF) may be used as a binder for binding materials, and an organic solvent such as N-methyl-2-pyrrolidone (hereinafter referred to as NMP) may be used as a solvent. On the other hand, the mainstream of the negative electrode slurry for lithium-ion secondary batteries is a slurry that uses styrene-butadiene rubber (hereinafter SBR), which is an aqueous dispersion binder, and water as a solvent. It should be noted that the materials used for the positive electrode slurry and the negative electrode slurry are not limited to the materials exemplified herein, unless specifically stated otherwise.

The mixture slurry applied in the coating step contains a required amount of solvent. In the step of drying the applied mixture slurry, it is necessary to cause such a solvent to evaporate. This means that, in the mass production of lithium-ion secondary batteries, a large amount of heat is required in the drying step in the manufacturing of electrode sheets. Moreover, in cases where an organic solvent is used, the organic solvent is contained in an exhaust gas in the drying step. For this reason, it is necessary to collect the organic solvent.

As illustrated in FIG. 1, the electrode manufacturing facility 10 includes a dryer 11, a first pipe 12, a solvent collection device 13, an outside air inlet pipe 14, a heat exchanger 15, a second pipe 16, a heating device 20, and a controller 40.

Dryer 11

The dryer 11 is a device that dries a sheet-shaped current collector coated with a mixture slurry in which electrode active material particles are dispersed in an organic solvent. In the embodiment shown in FIG. 1, the dryer includes a drying furnace 11*a*, a heater 11*b*, and a conveyor device 11*c*.

Herein, the drying furnace 11*a* may include a furnace chamber that is surrounded by a heat insulating material. Inside the drying furnace 11*a*, a dry atmosphere is formed in a closed space. The drying furnace 11*a* is provided with an inlet 11*a*1 into which the current collector coated with the mixture slurry is introduced, and an outlet 11*a*2. Inside the drying furnace 11*a*, a predetermined conveyance passage is provided along which the current collector coated with the mixture slurry is to be conveyed. Inside the drying furnace 11*a*, a dry atmosphere is formed that is at a temperature at which the solvent contained in the mixture slurry can evaporate, for example, at higher than or equal to 100° C.

The heater 11*b* is, for example, a device that heats the air supplied through the outside air inlet pipe 14 and supplies the air into the drying furnace 11*a*. The heater 11*b* may be composed of, for example, an electric heater. That said, the heater 11*b* is not limited to an electric heater but may be a gas heater or the like. When the solvent uses NMP, the heater 11*b* heats up the air supplied through the outside air inlet pipe 14 to a predetermined temperature (for example, 115° C.) and supplies the heated air to the drying furnace 11*a*.

The conveyor device 11*c* may be a device that conveys a sheet-shaped current collector coated with a mixture slurry. The current collector coated with the mixture slurry may be, for example, a strip-shaped sheet and may be conveyed along the predetermined conveyance passage inside the drying furnace 11*a*. The mixture slurry may be applied onto the current collector before the current collector enters the drying furnace 11*a*. In this embodiment, a coating device 11*d* for applying the mixture slurry onto the current collector is provided upstream of the inlet 11*a*1 of the drying furnace 11*a* in the current collector conveyance passage. Herein, the mixture slurry applied to the current collector may be a slurry in which electrode active material particles are dispersed in an organic solvent (for example, NMP).

First Pipe 12

The first pipe 12 is a pipe that sends the exhaust gas expelled from the dryer 11 to the solvent collection device 13. Here, the exhaust gas expelled from the dryer 11 contains a solvent component. The organic solvent used as the solvent component, such as NMP, has a boiling point higher than water. Accordingly, the exhaust gas expelled from the dryer 11 has a temperature of, for example, about 100° C. As illustrated in FIG. 1, the first pipe 12 is arranged from the drying furnace 11*a* through the heat exchanger 15 to the solvent collection device 13. In the embodiment shown in FIG. 1, the first pipe 12 is equipped with a blower fan 12*a*. The exhaust gas expelled from the dryer 11 is forcibly sent to the solvent collection device 13 by the blower fan 12*a*. The blower fan 12*a* may be disposed in front of the solvent collection device 13, in the first pipe 12. The blower fan 12*a* is controlled together with a later-described blower fan 14*a* that is disposed in the outside air inlet pipe 14 so that the drying conditions in the dryer 11 can be optimized. The flow velocity of the exhaust gas sent from the dryer 11 to the solvent collection device 13 may be controlled by controlling the blower fan 12*a*. In order to ensure stability of the flow velocity, it is also possible to provide a blower fan in the middle of the first pipe 12 according the length of the pipe. The airflow volumes of the blower fans provided in the facility may be controlled in order to, for example, maintain the conditions in the drying furnace.

Solvent Collection Device 13

The solvent collection device 13 is a wet-type collection device. In the embodiment shown in FIG. 1, water is supplied to the solvent collection device 13 through a water supply pipe 13*a*, and the solvent collection device 13 causes the organic solvent contained in the exhaust gas expelled from the dryer 11 to dissolve into water to collect the organic solvent. The organic solvent, such as NMP, easily dissolves into water. Therefore, when water is sprinkled in the exhaust gas expelled from the dryer 11, the organic solvent contained in the exhaust gas is absorbed by water and is collected efficiently.

Figure 2:
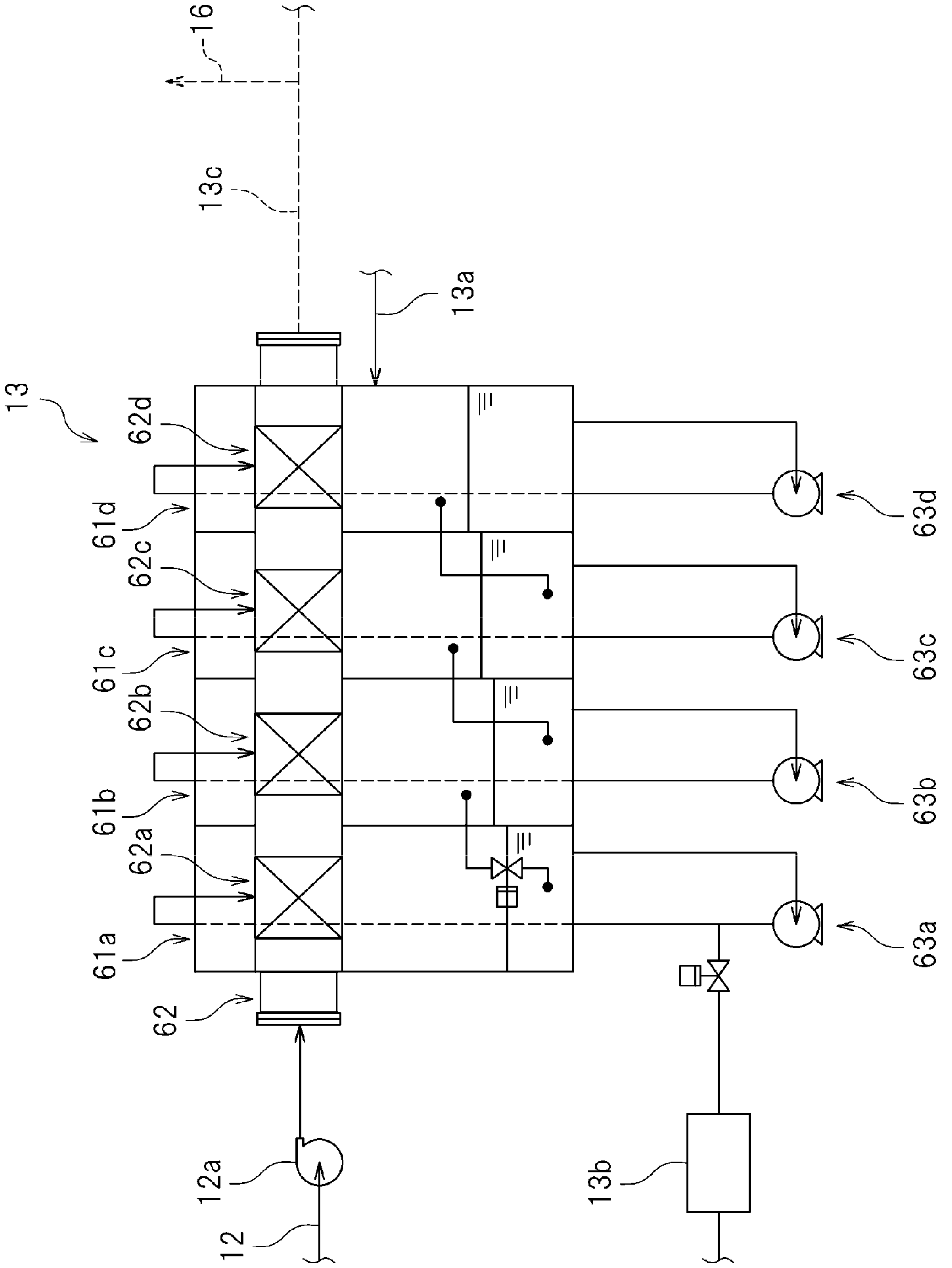
FIG. 2 is a schematic view of a solvent collection device 13.

FIG. 2 is a schematic view of the solvent collection device 13. The solvent collection device 13 includes a plurality of collection tanks 61*a* to 61*d* that are separated from each other. A pipe 62 in which the exhaust gas expelled from the dryer 11 is flowed is passed in upper portions of the collection tanks 61*a* to 61*d*. The collection tanks 61*a* to 61*d* are lined up in that order from the inlet end of the pipe 62 toward the outlet end thereof. Mist eliminators 62*a* to 62*d* for separating organic solvent from the exhaust gas are filled in the pipe 62. The mist eliminators may be composed of, for example, a mesh material called a demister.

The water to be supplied to the solvent collection device 13 is supplied to each of the collection tanks 61*a* to 61*d*. The water to be supplied to the solvent collection device 13 may be, for example, pure water or the like such as to be adjusted to required water quality. The water is supplied so that the level of the water reserved in each of the collection tanks 61*a* to 61*d* reaches a predetermined water level. The water may be sprinkled on the mist eliminators 62*a* to 62*d*. The water reserved in the collection tanks 61*a* to 61*d* may be pumped up by pumps 63*a* to 63*d* so as to be sprinkled from the top of the collection tanks 61*a* to 61*d*. The water sprinkled from the top of the collection tanks 61*a* to 61*d* is retained in the mist eliminators 62*a* to 62*d*. The organic solvent contained in the exhaust gas expelled from the dryer 11 is absorbed by the water when the exhaust gas passes through the mist eliminators 62*a* to 62*d*.

The water that has absorbed the organic solvent is collected in the collection tanks 61*a* to 61*d*. The water collected in the collection tanks 61*a* to 61*d* is sent in sequence from the collection tank 61*d* that is near the outlet end toward the collection tank 61*a* that is near the inlet end. This means that the concentration of the organic solvent is higher toward the collection tank 61*a* that is near the inlet end. For example, each of the collection tanks 61*a* to 61*d* measures the concentration of the organic solvent in the water collected the respective collection tanks 61*a* to 61*d*, and when the concentration of the organic solvent reaches a predetermined concentration based on the measured values, a valve is opened to send the water to the next one of the collection tanks. The collection tank 61*a* that is near the inlet end has a higher concentration of organic solvent, and the water is discharged one after another from the solvent collection device 13.

The water that has absorbed the organic solvent may be distilled by a reprocessing facility 13*b* or the like, as illustrated in FIG. 1, so that it can be separated into organic solvent and water. The water separated from the organic solvent may be used again in the solvent collection device 13. The separated organic solvent may be refined again so that it can be reused. The exhaust gas after the organic solvent has been absorbed by water in the solvent collection device 13 is expelled through a pipe 13*c*. The pipe 13*c* in which the exhaust gas expelled from the solvent collection device 13 is flowed is connected to the second pipe 16, as will be described later. In the example shown in FIG. 1, the reprocessing facility 13*b* is provided within the factory. It is also possible that the reprocessing facility 13*b* may be provided outside the factory, for example. When this is the case, a reserve tank for reserving the water that has absorbed the organic solvent may be provided, and the water may be transported with a tank truck or the like to the reprocessing facility 13*b* outside the factory, where the organic solvent is reprocessed.

Outside Air Inlet Pipe 14

The outside air inlet pipe 14 is a pipe that introduces outside air and sends it to the dryer 11. The outside air inlet pipe 14 is arranged so as to pass through the heat exchanger 15 and reach the dryer 11. The embodiment shown in FIG. 1 is configured so that a portion of the exhaust gas expelled from the solvent collection device 13 is supplied through the second pipe 16 to the outside air inlet pipe 14. The outside air inlet pipe 14 is provided with a blower fan 14*a* in front of the heat exchanger 15. Such a blower fan 14*a* enables outside air to be sent forcibly from the outside air inlet pipe 14 to the heat exchanger 15. The flow velocity of the outside air sent from the outside air inlet pipe 14 to the heat exchanger 15 may be controlled by controlling the blower fan 14*a*. In addition, the outside air inlet pipe 14 is also provided with a blower fan 14*b* in front of the dryer 11. The blower fan 14*b* enables outside air to be sent forcibly from the outside air inlet pipe 14 to the dryer 11. The flow velocity of the outside air sent from the outside air inlet pipe 14 to the dryer 11 may be controlled by controlling the blower fan 14*b*.

Heat Exchanger 15

The heat exchanger 15 is configured to exchange heat between the first pipe 12 and the outside air inlet pipe 14. Such heat exchanger 15 enables exchange of heat between the exhaust gas expelled from the dryer 11, which flows through the first pipe 12, and the outside air that is introduced from the outside air inlet pipe 14. This allows the temperature of the outside air introduced to the dryer 11 to be raised in advance. In addition, the exhaust gas expelled from the dryer 11, which flows through the first pipe 12, is passed through the heat exchanger 15 and supplied to the solvent collection device 13. The heat exchanger 15 lowers the temperature of the exhaust gas expelled from the dryer 11. In the solvent collection device 13, the lower the temperature of the exhaust gas expelled from the dryer 11, the more easily the solvent contained in the exhaust gas condenses, so the more efficiently the organic solvent can be absorbed by water.

Second Pipe 16

The second pipe 16 is connected to the pipe 13*c* in which the exhaust gas expelled from the solvent collection device 13 is flowed, and to a portion of the outside air inlet pipe 14 that is upstream of the heat exchanger 15. The second pipe 16 is a pipe that sends at least a portion of the exhaust gas after having passed through the solvent collection device 13 to the outside air inlet pipe 14. The second pipe 16 allows a portion of the exhaust gas after having passed through the solvent collection device 13 to be introduced into the outside air inlet pipe 14, then passed through the heat exchanger 15, and supplied to the dryer 11. Because the second pipe 16 allows a portion of the exhaust gas after having passed through the solvent collection device 13 to be introduced into the outside air inlet pipe 14, it is possible to stabilize the temperature of the air supplied to the heat exchanger 15.

Herein, the temperature of the outside air introduced into the outside air inlet pipe 14 is assumed to be an annual average of about 16° C. The temperature of the outdoor air introduced into the outdoor air inlet pipe 14 varies depending on the season and time of day. For example, the temperature of the outdoor air can be as high as about 35° C. during daytime in summer. On the other hand, the temperature of the outdoor air can be as low as about −2° C. during nighttime in winter. Thus, the outside air introduced into the outside air inlet pipe 14 is unstable throughout the year. On the other hand, the exhaust gas expelled from the dryer 11 is at about 100° C.

Although the temperature of the exhaust gas lowers in the solvent collection device 13 because the exhaust gas is mixed with the sprinkled water, the exhaust gas expelled from the solvent collection device 13 is kept at about 40° C., which is higher than the temperature of the outside air. Because a portion of the exhaust gas after having passed through the solvent collection device 13 is introduced into the outside air inlet pipe 14 through the second pipe 16, the temperature of the outside air that is introduced into the dryer 11 can be raised, so it is expected to reduce the amount of heat required for heating the outside air with the heater 11*b* of the dryer 11.

For example, it is assumed that, when the temperature of the outside air introduced into the outside air inlet pipe 14 is 16° C. and the temperature of the exhaust gas expelled from the dryer 11 is 100° C., the exhaust gas from the solvent collection device 13 is not introduced from the second pipe 16 and the outside air is heat-exchanged with the heat exchanger 15 as it is. In this case, the temperature of the outside air having passed through the heat exchanger 15 may become about 41° C. This air needs to be turned to be hot air at about 115° C. in the dryer 11, so the heater 11*b* of the dryer 11 requires a considerable amount of heat to heat the outside air.

In contrast, when the exhaust gas from the solvent collection device 13 is introduced from the second pipe 16 to the outside air introduced to the outside air inlet pipe 14, the temperature of the air supplied to the heat exchanger 15 can be raised to 29° C. Then, the temperature of the air can be raised to 51° C. through the heat exchanger 15. This air needs to be turned to be hot air at about 115° C. in the dryer 11. However, because the exhaust gas from the solvent collection device 13 is introduced from the second pipe 16 to the outside air introduced to the outside air inlet pipe 14, the temperature of the introduced air is higher by about 10° C. Thus, it is expected to reduce the amount of heat required for the heater 11*b* of the dryer 11 to heat the outside air.

As described above, outside air is introduced into the outside air inlet pipe 14, mixed in the outside air inlet pipe 14 with the exhaust gas after having passed through the solvent collection device 13 that is supplied from the second pipe 16, and further heat exchanged with the exhaust gas from the dryer 11 by the heat exchanger 15. This makes it possible to use the heat of the exhaust gas from the dryer 11 and to raise the temperature of the outside air to be introduced to the dryer 11 in advance. This lowers the energy required by the heater 11*b* of the dryer 11. Moreover, because the temperature of the exhaust gas expelled from the solvent collection device 13 is stable throughout the year, it is possible to stabilize the temperature of the outside air supplied by the outside air inlet pipe 14.

Herein, the exhaust gas after having passed through the solvent collection device 13 is highly humid. The electrode manufacturing facility 10 may further include a regulator valve 16*a* for regulating the flow rate of the second pipe 16. Because the second pipe 16 is provided with the regulator valve 16*a*, it is possible to regulate the exhaust gas after having passed through the solvent collection device 13 that is introduced to the outside air inlet pipe 14. This makes it possible to control the temperature and dew point of the gas that flows through the outside air inlet pipe 14.

For example, a controller 40 may be configured to detect at least one of the temperature and dew point of a gas flowing in the outside air inlet pipe 14 at a part of the second pipe 16 that is downstream of the outside air inlet pipe 14 and upstream of the heat exchanger 15, and execute a process of controlling the degree of opening of the regulator valve 16*a* based on the detected value. This makes it possible to regulate the amount of the exhaust gas introduced to the outside air inlet pipe 14 through the second pipe 16 while feeding back at least one of the temperature and dew point of the gas flowing in the outside air inlet pipe 14.

The controller 40 may be configured to detect the temperature or dew point of the gas flowing in the outside air inlet pipe 14 with a sensor 14*c* provided in the outside air inlet pipe 14 after the exhaust gas after having passed through the solvent collection device 13 has been introduced through the second pipe 16, and to regulate the degree of opening of the regulator valve 16*a* provided in the second pipe 16. The amount of the exhaust gas to be introduced into the outside air inlet pipe 14 through the second pipe 16 may be regulated taking the temperature or dew point of the gas flowing in the outside air inlet pipe 14 into consideration.

Here, the gas flowing in the outside air inlet pipe 14 is sent to the dryer 11. The higher the temperature of the gas flowing in the outside air inlet pipe 14, the better, but the lower the humidity of the gas flowing in the outside air inlet pipe 14, the better. The exhaust gas introduced to the outside air inlet pipe 14 through the second pipe 16 has a high humidity. For this reason, the amount of the exhaust gas to be introduced into the outside air inlet pipe 14 through the second pipe 16 may be regulated taking the dew point of the gas flowing in the outside air inlet pipe 14 into consideration, in addition to the temperature thereof. It is more preferable that the regulator valve 16*a* for regulating the flow rate of the second pipe 16 be controlled based on the temperature and the dew point of the gas flowing in the outside air inlet pipe 14.

For example, when the dew point of the gas flowing in the outside air inlet pipe 14 is lower than a predetermined dew point, the degree of opening of the regulator valve 16*a* may be adjusted so as to increase the amount of the exhaust gas to be introduced into the outside air inlet pipe 14 through the second pipe 16. When the dew point of the gas flowing in the outside air inlet pipe 14 is higher than a predetermined dew point, the degree of opening of the regulator valve 16*a* may be adjusted so as to decrease the amount of the exhaust gas to be introduced into the outside air inlet pipe 14 through the second pipe 16. It is also possible that when the dew point of the gas flowing in the outside air inlet pipe 14 becomes higher than a predetermined dew point, the regulator valve 16*a* may be adjusted to be closed.

It is also possible that when the temperature of the gas flowing in the outside air inlet pipe 14 is lower than a predetermined temperature, the degree of opening of the regulator valve 16*a* may be adjusted so as to increase the amount of the exhaust gas to be introduced into the outside air inlet pipe 14 through the second pipe 16. When the temperature of the gas flowing in the outside air inlet pipe 14 is higher than a predetermined temperature, the degree of opening of the regulator valve 16*a* may be adjusted so as to decrease the amount of the exhaust gas to be introduced into the outside air inlet pipe 14 through the second pipe 16. It is also possible that when the temperature of the gas flowing in the outside air inlet pipe 14 becomes higher than a predetermined temperature, the regulator valve 16*a* may be adjusted to be closed.

The controller 40 may be configured to detect the concentration of the organic solvent contained in the exhaust gas flowing in the second pipe 16 at a part of the second pipe 16 that is downstream of the outside air inlet pipe 14 and upstream of the heat exchanger 15, and execute a process of controlling the degree of opening of the regulator valve 16*a* based on the concentration of the organic solvent that has been detected. This makes it possible to adjust the amount of the exhaust gas to be introduced into the outside air inlet pipe 14 through the second pipe 16 while monitoring the concentration of the organic solvent in the outside air inlet pipe 14.

The controller 40 may be configured to detect the concentration of the organic solvent in the gas flowing in the outside air inlet pipe 14 with the sensor 14*c* provided in the outside air inlet pipe 14 after the exhaust gas after having passed through the solvent collection device 13 has been introduced through the second pipe 16, and to regulate the degree of opening of the regulator valve 16*a* provided in the second pipe 16. Here, when the concentration of the organic solvent exceeds a predetermined concentration in the outside air introduced into the dryer 11, the drying of the mixture slurry in the dryer 11 is slowed down. The concentration of the organic solvent in the outside air to be introduced into the dryer 11 may be restricted to such a level as not to slow down the drying of the mixture slurry in the dryer 11. In addition, because the organic solvent is in many cases a hazardous material, it is also possible that the regulator valve 16*a* provided in the second pipe 16 may be shut off when the concentration exceeds a predetermined concentration from the viewpoint of safety.

Thus, the degree of opening of the regulator valve 16*a* provided in the second pipe 16 may be configured to be adjusted based on the concentration of the organic solvent and at least one of the temperature and dew point of the gas flowing in the outside air inlet pipe 14, after the exhaust gas after having passed through the solvent collection device 13 is introduced through the second pipe 16. This makes it possible to control the temperature, the dew point, and the organic solvent concentration of the outside air that is introduced into the dryer 11 through the outside air inlet pipe 14. For example, the regulator valve 16*a* provided in the second pipe 16 may be controlled in such a manner that the degree of opening of the regulator valve 16*a* is adjusted based on at least one of the temperature and dew point and the regulator valve 16*a* is closed when the concentration of the organic solvent exceeds a predetermined concentration. It is also possible that the regulating valve 16*a* may be controlled with two factors, temperature and dew point. For example, it is also possible that while the degree of opening of the regulator valve 16*a* is controlled based on the temperature, the degree of opening of the regulator valve 16*a* may be prevented from increasing when the dew point exceeds a certain value. This can prevent the degree of opening of the regulator valve 16*a* from increasing, for example, when the dew point exceeds a certain value even in the case where the temperature of the gas flowing in the outside air inlet pipe 14 is lower than a predetermined value because of temperature control after the exhaust gas after having passed through the solvent collection device 13 is introduced through the second pipe 16. This can prevent the dew point of the gas flowing in the outside air inlet pipe 14 from increasing above a certain value. Thus, the degree of opening of the regulator valve 16*a* and the like may be controlled so that the quality of the gas flowing in the outside air inlet pipe 14 that is measured with the sensor 14*c* can be adjusted to predetermined quality.

Heating Device 20

In the embodiment shown in FIG. 1, the outside air inlet pipe 14 further includes a heating device 20. The heating device 20 is disposed at a portion of the outside air inlet pipe 14, which sends the outside air to the dryer 11, that is downstream of the heat exchanger 15. The heating device 20 is a device that heats up the gas sent to the dryer 11 through the outside air inlet pipe 14 at the portion downstream of the heat exchanger 15. In this embodiment, the heating device 20 includes a heat pump 21 and a heat exchange coil 22. The heat exchange coil 22 is disposed in the middle of the outside air inlet pipe 14, and may be a plate type heat exchanger or the like that has sufficient capability of raising the temperature of the outside air inlet pipe 14 to higher than a certain value. The heat pump 21 may be a hot water heat pump unit. The hot water heat pump unit is, for example, a heat pump unit equipped with a heat transfer medium circulation system including a heat absorbing part and a heat dissipating part. The hot water heat pump unit receives heat from a water heat source or an air heat source outside the system by the heat absorbing part and dissipates the heat to a heat transfer system that circulates between the heat pump 21 and the heat exchange coil 22 from the heat dissipating part. This makes it possible to supply required hot water to the heat exchange coil 22.

The heat exchange coil 22 is supplied with hot water, for example, at about 90° C. from the heat pump 21 to heat the gas flowing in the outside air inlet pipe 14. Then, the outside air heated by the heat exchange coil 22 is supplied to the dryer 11. When the temperature of the gas flowing in the outside air inlet pipe 14 that is expelled from the heat exchanger 15 is about 51° C., the temperature of the outside air supplied to the dryer 11 can be raised to about 80° C. by heating the gas flowing in the outside air inlet pipe 14 through the heating device 20. The heat pump 21 is able to utilize a large amount of heat energy with a small amount of input energy. Thus, the heating device 20 enables the outside air to be further heated and thereafter supplied to the device, so it is possible to significantly reduce the energy required by the heater 11*b* of the dryer 11.

For example, the electrode manufacturing facility 10 may be configured to detect the temperature of the gas flowing in the outside air inlet pipe 14 with a sensor 23 provided downstream of the heating device 20 and to control the degree of opening of a regulator valve 24 provided in the heat pump 21. By controlling the degree of opening of the regulator valve 24 based on the temperature of the gas flowing in the outside air inlet pipe 14, the amount of heat transfer medium circulating in the heat pump 21 is controlled so that the gas flowing in the outside air inlet pipe 14 can be heated to a stable temperature. The amount of heat exchanged with the gas flowing in the outside air inlet pipe 14 may be adjusted in the heat exchange coil 22 in this way. This makes it possible to adjust the temperature of the outside air supplied to the dryer 11. In addition, the heat pump 21 is able to cool other heat transfer media. For example, the heat pump 21 may use water as the heat transfer medium. The use of water as the heat transfer medium makes it possible to obtain cold water at about 10° C., so that it is possible to obtain, as by-products, cooling water for air conditioning or for machines that needs to consume energy to be cooled in external facilities. This provides advantageous effects of further energy reduction.

An example of the heating device 20 herein illustrates an embodiment in which a heat pump and a heat exchange coil that can heat the gas flowing in the outside air inlet pipe 14 efficiently are used. It is sufficient that the heating device 20 may be, but is not limited to, a device that heats up the gas sent to the dryer 11 through the outside air inlet pipe 14 at a location downstream of the heat exchanger 15.

Thus, by introducing the exhaust gas from the solvent collection device 13 into the outside air inlet pipe 14, it is possible to raise the temperature of the outside air to be introduced into the dryer 11 through the outside air inlet pipe 14. This serves to reduce the energy required by the heater 11*b* of the dryer 11. Moreover, the energy required by the heater 11*b* of the dryer 11 is reduced significantly by heating the outside air supplied to the dryer 11 through the heat exchanger 15 by the heating device 20. From the viewpoint of reducing the energy required by the heater 11*b* of the dryer 11, merely introducing the exhaust gas from the solvent collection device 13 into the outside air inlet pipe 14 and merely heating the gas with the heating device 20 are both effective. The capacity required for the heating device 20 can be further reduced by introducing the exhaust gas from the solvent collection device 13 into the outside air inlet pipe 14 through the second pipe 16, moreover heating the gas through the heat exchanger 15, and further heating the gas with the heating device 20. This makes it possible to reduce the size of the heating device 20, and also reduces equipment costs and running costs.

Here, a method of manufacturing an electrode includes a drying step and a solvent collecting step. The drying step is a step of drying a sheet-shaped current collector coated with a mixture slurry in which electrode active material particles are dispersed in an organic solvent. In the electrode manufacturing facility 10 described above, the drying step is implemented by the dryer 11. The solvent collecting step is a step of collecting the organic solvent by spraying water to an exhaust gas produced in the drying step and causing the organic solvent contained in the exhaust gas to dissolve into the water. In the electrode manufacturing facility 10 described above, the solvent collecting step is implemented by the solvent collection device 13. In the drying step, a portion of the exhaust gas after having been sprayed water in the solvent collecting step may be mixed with outside air, heat-exchanged with the exhaust gas produced in the drying step, and thereafter introduced into the dryer 11. This raises the temperature of the outside air introduced to the dryer 11. This makes it possible to lower the energy required by the heater 11*b* of the dryer 11.

The amount of a portion of the exhaust gas sprayed with water that is mixed with the outside air in the solvent collecting step may be adjusted based on the dew point of the gas after having been mixed. Alternatively, the amount of a portion of the exhaust gas sprayed with water that is mixed with the outside air in the solvent collecting step may be adjusted based on the concentration of the organic solvent in the gas after having been mixed. The amount of a portion of the exhaust gas sprayed with water that is mixed with the outside air in the solvent collecting step may be adjusted based on the dew point of the gas after having been mixed and the concentration of the organic solvent in the gas after having been mixed. For example, the amount of a portion of the exhaust gas sprayed with water that is mixed with the outside air in the solvent collecting step may be adjusted based on the temperature of the gas after having been mixed. The amount of a portion of the exhaust gas sprayed with water that is mixed with the outside air in the solvent collecting step may be adjusted based on the temperature of the gas after having been mixed and the concentration of the organic solvent in the gas after having been mixed. The amount of a portion of the exhaust gas sprayed with water that is mixed with the outside air in the solvent collecting step may be adjusted based on the temperature, dew point, and organic solvent concentration of the gas after having been mixed.

The method of manufacturing electrodes may involve heat-exchanging of the outside air with the exhaust gas produced in the drying step, further heating the outside air, and introducing the outside air into the dryer. This makes it possible to lower the energy required by the heater 11*b* of the dryer 11. For example, in the drying step, it is also possible that a gas in which outside air is mixed with a portion of the exhaust gas after having been sprayed with water in the solvent collecting step may be heat-exchanged with the exhaust gas produced in the drying step, thereafter further heated, and then introduced into the dryer. This significantly lowers the energy required by the heater 11*b* of the dryer 11.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

As has been described above, the present description contains the disclosure as set forth in the following items.

Item 1:

An electrode manufacturing facility including:

a dryer;

a solvent collection device causing an organic solvent contained in an exhaust gas expelled from the dryer to dissolve into water to collect the organic solvent;

a first pipe for sending the exhaust gas expelled from the dryer to the solvent collection device;

an outside air inlet pipe introducing outside air and sending the air to the dryer;

a heat exchanger configured to exchange heat between the first pipe and the outside air inlet pipe; and a second pipe, being connected to a pipe to which the exhaust gas after having passed through the solvent collection device is expelled and to a portion of the outside air inlet pipe that is upstream of the heat exchanger, for sending at least a portion of the exhaust gas after having passed through the solvent collection device to the outside air inlet pipe, wherein:

the dryer includes:

a drying furnace;

a heater for heating the air supplied through the outside air inlet pipe and supplying the air into the drying furnace; and a conveyor device conveying a sheet-shaped current collector coated with a mixture slurry in which electrode active material particles are dispersed in an organic solvent, along a predetermined conveyance passage in the drying furnace.

Item 2:

The electrode manufacturing facility according to item 1, further including a regulator valve regulating a flow rate of the second pipe.

Item 3:

An electrode manufacturing facility according to item 2, further including:

a controller, wherein;

the controller is configured to:

detect at least one of a temperature and a dew point of a gas flowing in the outside air inlet pipe at a location of the second pipe that is downstream of the outside air inlet pipe and upstream of the heat exchanger; and execute a process of controlling a degree of opening of the regulator valve based on the at least one of the temperature and the dew point that have been detected.

Item 4:

An electrode manufacturing facility according to item 2, further including:

a controller, wherein;

the controller is configured to:

detect a concentration of the organic solvent contained in the exhaust gas flowing in the second pipe at a location of the second pipe that is downstream of the outside air inlet pipe and upstream of the heat exchanger; and execute a process of controlling a degree of opening of the regulator valve based on the concentration of the organic solvent that has been detected.

Item 5:

An electrode manufacturing facility according to item 2, further including:

a controller, wherein;

the controller is configured to:

detect a concentration of the organic solvent in a gas flowing in the outside air inlet pipe and at least one of a temperature and a dew point of the gas flowing in the outside air inlet pipe, at a location of the second pipe that is downstream of the outside air inlet pipe and upstream of the heat exchanger; and execute a process of controlling a degree of opening of the regulator valve based on the concentration of the organic solvent that has been detected and at least one of the temperature and the dew point that have been detected.

Item 6:

The electrode manufacturing facility according to any one of items 1 to 5, wherein the outside air inlet pipe further includes a heating device disposed downstream of the heat exchanger.

Item 7:

The electrode manufacturing facility according to item 6, wherein the heating device is a heat exchange coil connected to a heat pump.

Item 8:

An electrode manufacturing facility including:

a dryer;

a solvent collection device causing an organic solvent contained in an exhaust gas expelled from the dryer to dissolve into water to collect the organic solvent;

a first pipe for sending the exhaust gas expelled from the dryer to the solvent collection device;

an outside air inlet pipe for introducing outside air and sending the air to the dryer;

a heat exchanger configured to exchange heat between the first pipe and the outside air inlet pipe, wherein:

the dryer includes:

a drying furnace;

a heater for heating the air supplied through the outside air inlet pipe and supplying the air into the drying furnace; and a conveyor device conveying a sheet-shaped current collector coated with a mixture slurry in which electrode active material particles are dispersed in an organic solvent, along a predetermined conveyance passage in the drying furnace, wherein the outside air inlet pipe includes a heating device disposed downstream of the heat exchanger.

Item 9:

The electrode manufacturing facility according to item 8, wherein the heating device is a heat exchange coil connected to a heat pump.

Item 10:

A method of manufacturing electrodes, including:

a drying step of drying a sheet-shaped current collector coated with a mixture slurry in which electrode active material particles are dispersed in an organic solvent; and a solvent collecting step of collecting the organic solvent by spraying water to an exhaust gas produced in the drying step and causing the organic solvent contained in the exhaust gas to dissolve into the water, wherein:

in the drying step, a portion of the exhaust gas after having been sprayed water in the solvent collecting step is mixed with outside air, heat-exchanged with the exhaust gas produced in the drying step, and introduced into the dryer.

Item 11:

The electrode manufacturing method according to item 10, wherein an amount of a portion of the exhaust gas after having been sprayed with water that is mixed with the outside air in the solvent collecting step is adjusted based on at least one of a temperature and a dew point of the gas after having been mixed.

Item 12:

The electrode manufacturing method according to item 10, wherein an amount of a portion of the exhaust gas after having been sprayed with water that is mixed with the outside air in the solvent collecting step is adjusted based on a concentration of the organic solvent in the gas after having been mixed.

Item 13:

The electrode manufacturing method according to item 10, wherein an amount of a portion of the exhaust gas after having been sprayed with water that is mixed with the outside air in the solvent collecting step is adjusted based on a concentration of the organic solvent in the gas after having been mixed and at least one of a temperature and a dew point of the gas after having been mixed.

Item 14:

The electrode manufacturing method according to any one of items 10 to 13, wherein, in the step of drying, a gas in which outside air is mixed with a portion of the exhaust gas after having been sprayed with water in the solvent collecting step is heat-exchanged with the exhaust gas produced in the drying step, thereafter further heated, and then introduced into the dryer.

Item 15:

A method of manufacturing electrodes, including:

a drying step of drying a sheet-shaped current collector coated with a mixture slurry in which electrode active material particles are dispersed in an organic solvent; and a solvent collecting step of collecting the organic solvent by spraying water to an exhaust gas produced in the drying step and causing the organic solvent contained in the exhaust gas to dissolve into the water, wherein:

in the drying step, outside air is heat-exchanged with the exhaust gas produced in the drying step, further heated, and thereafter introduced into a dryer.

What is claimed is:

1. An electrode manufacturing facility comprising:

a dryer;

a solvent collection device causing an organic solvent contained in an exhaust gas expelled from the dryer to dissolve into water to collect the organic solvent;

a first pipe for sending the exhaust gas expelled from the dryer to the solvent collection device;

an outside air inlet pipe for introducing outside air and sending the air to the dryer;

a heat exchanger configured to exchange heat between the first pipe and the outside air inlet pipe; and a second pipe, being connected to a pipe to which the exhaust gas after having passed through the solvent collection device is expelled and to a portion of the outside air inlet pipe that is upstream of the heat exchanger, for sending at least a portion of the exhaust gas after having passed through the solvent collection device to the outside air inlet pipe, wherein:

the dryer includes:

a drying furnace;

a heater for heating the air supplied through the outside air inlet pipe and supplying the air into the drying furnace; and a conveyor device conveying a sheet-shaped current collector coated with a mixture slurry in which electrode active material particles are dispersed in an organic solvent, along a predetermined conveyance passage in the drying furnace.

2. The electrode manufacturing facility according to claim 1, further comprising a regulator valve regulating a flow rate of the second pipe.

3. The electrode manufacturing facility according to claim 2, further comprising:

a controller, wherein;

the controller is configured to:

detect at least one of a temperature and a dew point of a gas flowing in the outside air inlet pipe at a location of the second pipe that is downstream of the outside air inlet pipe and upstream of the heat exchanger; and execute a process of controlling a degree of opening of the regulator valve based on the at least one of the temperature and the dew point that have been detected.

4. The electrode manufacturing facility according to claim 2, further comprising:

a controller, wherein;

the controller is configured to:

detect a concentration of the organic solvent contained in the exhaust gas flowing in the second pipe at a location of the second pipe that is downstream of the outside air inlet pipe and upstream of the heat exchanger; and execute a process of controlling a degree of opening of the regulator valve based on the concentration of the organic solvent that has been detected.

5. The electrode manufacturing facility according to claim 2, further comprising:

a controller, wherein;

the controller is configured to:

detect a concentration of the organic solvent in a gas flowing in the outside air inlet pipe and at least one of a temperature and a dew point of the gas flowing in the outside air inlet pipe, at a location of the second pipe that is downstream of the outside air inlet pipe and upstream of the heat exchanger; and execute a process of controlling a degree of opening of the regulator valve based on the concentration of the organic solvent that has been detected and at least one of the temperature and the dew point that have been detected.

6. The electrode manufacturing facility according to claim 1, wherein the outside air inlet pipe further comprises a heating device disposed downstream of the heat exchanger.

7. The electrode manufacturing facility according to claim 6, wherein the heating device is a heat exchange coil connected to a heat pump.

8. An electrode manufacturing facility comprising:

a dryer;

a solvent collection device causing an organic solvent contained in an exhaust gas expelled from the dryer to dissolve into water to collect the organic solvent;

a first pipe for sending the exhaust gas expelled from the dryer to the solvent collection device;

an outside air inlet pipe for introducing outside air and sending the air to the dryer; and a heat exchanger configured to exchange heat between the first pipe and the outside air inlet pipe, wherein:

the dryer includes:

a drying furnace;

a heater for heating the air supplied through the outside air inlet pipe and supplying the air into the drying furnace; and a conveyor device conveying a sheet-shaped current collector coated with a mixture slurry in which electrode active material particles are dispersed in an organic solvent, along a predetermined conveyance passage in the drying furnace, wherein the outside air inlet pipe includes a heating device disposed downstream of the heat exchanger.

9. The electrode manufacturing facility according to claim 8, wherein the heating device is a heat exchange coil connected to a heat pump.

10. A method of manufacturing an electrode comprising:

a drying step of drying a sheet-shaped current collector coated with a mixture slurry in which electrode active material particles are dispersed in an organic solvent; and a solvent collecting step of collecting the organic solvent by spraying water to an exhaust gas produced in the drying step and causing the organic solvent contained in the exhaust gas to dissolve into the water;

wherein in the drying step, a portion of the exhaust gas after having been sprayed water in the solvent collecting step is mixed with outside air, heat-exchanged with the exhaust gas produced in the drying step, and introduced into the dryer, or wherein in the drying step, outside air is heat-exchanged with the exhaust gas produced in the drying step, further heated, and thereafter introduced into a dryer.

11. The method according to claim 10, wherein in the drying step, a portion of the exhaust gas after having been sprayed water in the solvent collecting step is mixed with outside air, heat-exchanged with the exhaust gas produced in the drying step, and introduced into the dryer.

12. The method according to claim 11, wherein an amount of a portion of the exhaust gas after having been sprayed with water that is mixed with the outside air in the solvent collecting step is adjusted based on at least one of a temperature and a dew point of the gas after having been mixed.

13. The method according to claim 11, wherein an amount of a portion of the exhaust gas after having been sprayed with water that is mixed with the outside air in the solvent collecting step is adjusted based on a concentration of the organic solvent in the gas after having been mixed.

14. The method according to claim 11, wherein an amount of a portion of the exhaust gas after having been sprayed with water that is mixed with the outside air in the solvent collecting step is adjusted based on a concentration of the organic solvent in the gas after having been mixed and at least one of a temperature and a dew point of the gas after having been mixed.

15. The method according to claim 11, wherein, in the step of drying, a gas in which outside air is mixed with a portion of the exhaust gas after having been sprayed with water in the solvent collecting step is heat-exchanged with the exhaust gas produced in the drying step, thereafter further heated, and then introduced into the dryer.

16. A method according to claim 10, wherein, in the drying step, outside air is heat-exchanged with the exhaust gas produced in the drying step, further heated, and thereafter introduced into a dryer.

* * * * *